United States Patent
Bartling et al.

(10) Patent No.: US 7,563,531 B2
(45) Date of Patent: Jul. 21, 2009

(54) AIR CELL WITH MODIFIED SEALING TAB

(75) Inventors: Brandon A. Bartling, Avon Lake, OH (US); Timothy D. Foley, Wellington, OH (US); Sonya C. Pitts, Wellington, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 806 days.

(21) Appl. No.: 11/166,532

(22) Filed: Jun. 24, 2005

(65) Prior Publication Data

US 2006/0292427 A1    Dec. 28, 2006

(51) Int. Cl.
  *H01M 2/12* (2006.01)
  *H01M 12/06* (2006.01)
(52) U.S. Cl. .............................. 429/27; 429/82; 429/86
(58) Field of Classification Search ................... 429/27, 429/28, 29, 82, 86
  See application file for complete search history.

(56) References Cited

U.S. PATENT DOCUMENTS

| | | | |
|---|---|---|---|
| 4,649,090 A * | 3/1987 | Oltman et al. ................. | 429/29 |
| 5,795,667 A | 8/1998 | McKenzie et al. ............. | 429/27 |
| 5,958,615 A | 9/1999 | McKenzie et al. ............. | 429/27 |
| 6,329,095 B1 * | 12/2001 | Farnworth et al. ............. | 429/48 |
| 7,056,617 B2 * | 6/2006 | Kelsey et al. .................. | 429/82 |
| 7,405,014 B2 * | 7/2008 | Bartling et al. ................ | 429/27 |
| 2005/0136322 A1 | 6/2005 | Bartling | |

FOREIGN PATENT DOCUMENTS

| | | |
|---|---|---|
| JP | 57115771 | 7/1982 |
| JP | 58 161246 A | 9/1983 |
| JP | 01151166 | 6/1989 |
| JP | 01-283776 A | 11/1989 |
| JP | 06231808 | 8/1994 |
| JP | 06260216 | 9/1994 |
| WO | 02/061859 A2 | 8/2002 |

* cited by examiner

*Primary Examiner*—Stephen J. Kalafut
(74) *Attorney, Agent, or Firm*—Russell H. Toye, Jr.

(57) ABSTRACT

An air depolarized battery with an improved sealing member for sealing the air inlet port(s) of the battery before use is disclosed. The sealing member has areas of relatively high and low permeability, with an area of low permeability over at least a portion of an air inlet port. The sealing member may comprise a plurality of layers, where the area of highest permeability includes a portion of the lowest permeability layer that has a higher permeability than a surrounding portion thereof. The rate of flow of air through the low permeability area and into the battery can be easily modified to maintain a desired battery open circuit voltage during battery storage to allow activation of the battery within a short time after removal of the sealing member, while minimizing losses in discharge capacity before use.

27 Claims, 2 Drawing Sheets

AIR CELL WITH MODIFIED SEALING TAB

BACKGROUND

This invention relates to an air depolarized electrochemical battery, particularly an alkaline zinc/air battery, with a sealing member covering the air inlet port(s) in the battery housing.

An air depolarized battery is a battery that has a negative electrode that includes an active material contained within the battery and a positive electrode, called an air electrode that includes an oxygen reduction material, such as a catalyst. The catalyst reduces oxygen contained in air that enters the battery through one or more air inlet ports, producing hydroxyl ions, which migrate to the anode, where they are oxidized. The battery may contain a single air depolarized cell, or it may contain more than one cell.

An air depolarized cell can have one or more positive electrodes. One type of cell with more than one positive electrode is an air-assisted cell, which has a positive electrode containing an active material and an air electrode. When the battery is discharged, the active material in the first positive electrode can be reduced, and when the battery is at rest (or being discharged at a low rate), the air electrode can reduce oxygen in air, entering the cell to recharge the first positive electrode. An example of an air-assisted cell is disclosed in U.S. Pat. Nos. 6,383,674 and 5,079,106, which are hereby incorporated by reference.

Prior to use, an air depolarized battery is sealed from the ambient air. This is often done with a removable or puncturable sealing member placed over or within the air inlet port(s). Common types of removable sealing members include adhesive tapes and tabs, placed on an external surface of the battery housing so that they cover the air inlet port(s) during battery manufacturing, and removed by the user just prior to using the battery.

The sealing member substantially limits the flow of gases into and out of the battery. This serves a number of purposes. It minimizes the rate of entry of oxygen into the battery to prevent unnecessary consumption of the active anode material in the cell before the cell is put into use. It helps maintain the desired amount of electrolyte solvent (e.g., water) in the cell; if too much water leaves the battery, the maximum discharge reaction rate will be reduced; and if too much water enters the battery, the desired discharge reaction may conclude prematurely and the maximum discharge reaction rate can also be reduced. It also minimizes the entry of undesirable gases, such as carbon dioxide, that can cause degradation of the cell's maximum current capability and discharge capacity.

While it is desirable to substantially limit the flow of gases into and out of the battery, completely sealing the battery is undesirable for some types of air depolarized batteries. If no oxygen can enter the battery, the battery voltage drops as the oxygen initially sealed within the battery is consumed. If the voltage drops too far, it is not possible to distinguish between a good battery and a defective battery with a simple open circuit voltage test. Similarly, if the voltage drops too far the time after removal of the sealing member required for the battery to be able to sustain a suitable operating voltage can become so long that the user perceives the battery to be defective because it will not properly operate the device into which it has just been installed.

Consequently, there must be a balance between sealing the battery well enough to prevent degradation of battery discharge performance during storage and sealing the battery so we that it either cannot be distinguished from a bad battery or is mistaken for a bad battery.

In the past several approaches have been taken to achieve the desired balance between sealing air depolarized batteries well enough and sealing them too well. Examples can be found in U.S. Pat. Nos. 4,649,090 and 5,958,615, which are hereby incorporated by reference and in unexamined Japanese Patent Publication Nos. 06-260216, 06-231808, 01-151166 and 57-115771. Past attempts have included making the sealing member from a single base material or a laminate of several different materials with just the right transmission rates of various gases, but finding the optimal material or combination of materials that have suitable processing characteristics and an acceptable cost has proven to be very difficult. Various coatings have also been applied to the surfaces of sealing members, but this has also met with limited success. Adding a deoxidizer to the adhesive layer of the sealing member can reduce the oxygen transmission rate, but it may not have any effect on the transmission rates of other gases. Selecting adhesive materials based on their adhesion properties and varying the thickness of the adhesive layer of the sealing member also have their limitations, particularly in modifying the transmission rates through the sealing member (i.e., between its major surfaces), as opposed to the transmission rates through the adhesive layer, parallel to the major surfaces of the sealing member.

The battery housing has also been modified in various ways to change the rate of entry of gases into the cell without changing the sealing member. Examples can be found in U.S. Pat. Nos. 5,795,667 and 5,958,615. The number and size of the air inlet ports in the battery housing have been changed to control the rate of entry of air into the battery, and the locations of the air inlet ports have also been adjusted to improve the high rate capability of the batteries, but these factors have little effect before the sealing member is removed. The air inlet port has also been modified, so the port diameter on the outer surface is greater than the diameter on the inner surface of the container, to increase the ratio of air inlet to moisture egress before removal of the sealing member. However, this can increase the variability of the air inlet port size and shape and may also contribute to deformation of the can bottom during can manufacturing and battery closing, especially when the bottom of the can is thin.

The prior approaches, even if successful for one particular battery type and size, may not be readily adaptable to others. For example, the sealing member composition, permeability, adhesive and the like that is optimum for one battery may not be optimum for another. This can require repeating long, expensive development programs for each additional battery type and/or size.

In view of the above, an object of the present invention is to provide a sealing member that is easy and economical to manufacture and that will provide a good balance between maximizing battery storage life and maintaining an adequate battery voltage before use.

Another object of the invention is to provide a sealing member that can be readily modified for use with batteries of different types and sizes.

Yet another object of the invention is to provide a battery with air inlet port dimensions and external surfaces that are uniform and easy to manufacture and control.

SUMMARY

The above objects are met and disadvantages of the prior art are overcome by the present invention, in which a sealing member covering one or more of the inlet ports of an air cell battery has an area with a relatively high gas permeability disposed over a portion of the air inlet port. The permeability of the high permeability area can be adjusted relatively easily, and the invention can also be combined with other methods of modifying the rate (volume per unit of time) of gas ingress/egress into/out of the battery to increase flexibility in achieving a desired balance between gas ingress and egress rates.

Accordingly, one aspect of the present invention is directed to an air depolarized battery comprising a negative electrode, a positive electrode including an oxygen reduction material, a separator disposed between the negative and positive electrodes, an electrolyte, a housing for containing the electrodes, separator and electrolyte, an air inlet port disposed in the housing for allowing entry of oxygen from outside the housing into the battery; and a sealing member disposed on an external surface of the housing, covering the air inlet port, for partially sealing the housing. The sealing member has two major surfaces, areas of relatively high permeability and relatively low permeability between the two major surfaces, and an area with a relatively high permeability between the two major surfaces is disposed over a portion of the air inlet port.

Another aspect of the invention is directed to an air depolarized battery comprising a negative electrode including zinc, a positive electrode including an oxygen reduction material, a separator disposed between the negative and positive electrodes, an electrolyte comprising an alkaline aqueous solution, a housing for containing the electrodes, separator and electrolyte, an air inlet port disposed in the housing for allowing entry of oxygen from outside the into the battery, and a sealing member disposed on an external surface of the housing, covering the air inlet port, for partially sealing the housing. The sealing member comprises two major surfaces, has areas of relatively high permeability and relatively low permeability between the two major surfaces, and an area with a relatively high permeability between the two major surfaces is disposed over a portion of the air inlet port.

These and other features, advantages and objects of the present invention will be further understood and appreciated by those skilled in the art by reference to the following specification, claims and appended drawings.

Unless otherwise specified, the following definitions and methods are used herein:
(1) about means within experimental error in measurement and rounding, and averages are as determined from at least three individual values;
(2) air cell means an electrochemical battery cell with an oxygen reduction electrode that uses oxygen contained in air from outside the cell as an active material;
(3) button cell means a button-shaped, cylindrical electrochemical battery cell with an overall height greater than its diameter;
(4) permeability of an object means a rate of transmission of gas through the object, from a first surface to an opposing second surface of the object, expressed as a volume of gas per unit of surface area per unit of time after the gas initially reaches the second surface, where the surface area is the area of the first surface to which the gas is exposed;
(5) tab is a sealing member for covering and partially sealing one or more air inlet ports in a cell housing to the flow of gas between the inside of the cell and the external atmosphere and is used below to refer to a variety of different types of sealing members, including, but not limited to tapes and heat-shrinkable films;
(6) thickness of a sealing member means the distance between and normal to its two major surfaces;

The values of properties and characteristics disclosed herein are as determined by the disclosed test methods; equivalent methods which will give comparable results may be substituted.

Unless otherwise specified herein, all disclosed characteristics and ranges are as determined at room temperature (20-25° C.) and one atmosphere of pressure.

DESCRIPTION

Figure 1:
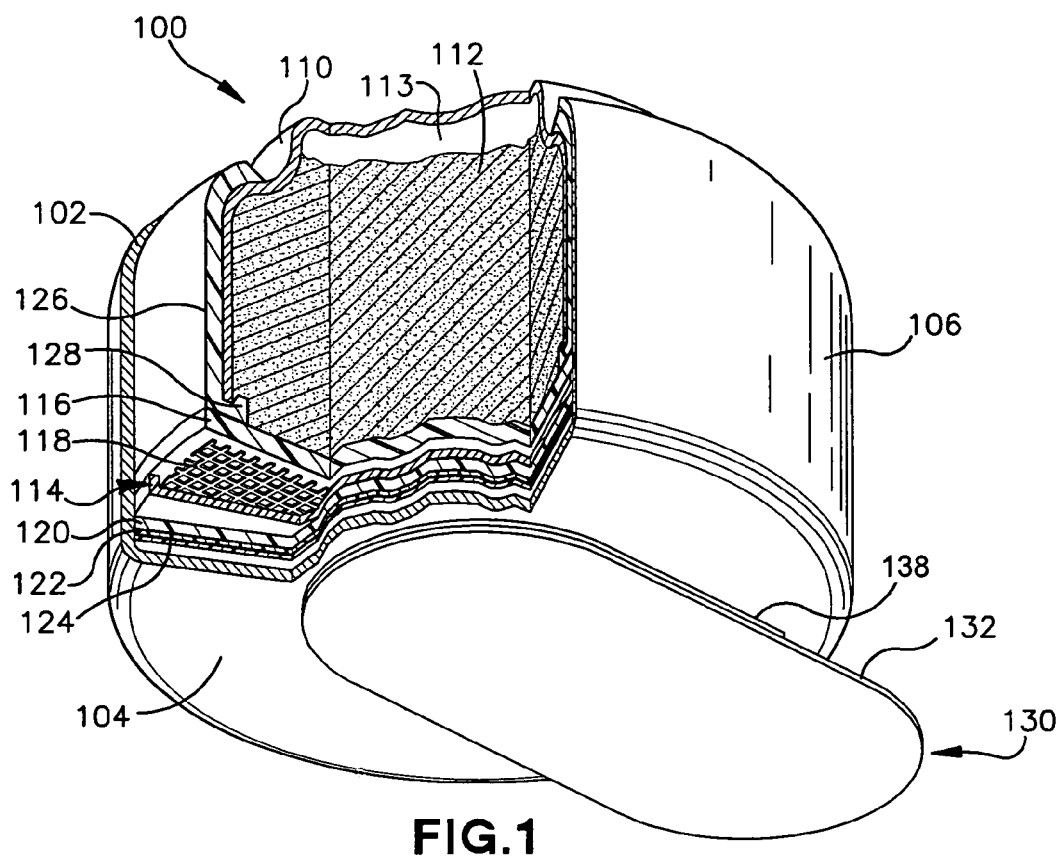
FIG. 1 is a perspective cut-away view of an air cell with a sealing member attached thereto.

While the invention is not limited to a button type battery, it will be better understood by reference to FIG. 1, which shows a button air cell battery 100 with a sealing member 130, attached to the bottom of the cell 100, covering one or more air inlet ports. One skilled in the art can appreciate that the invention can also be used with other air cell batteries, including larger cylindrical and prismatic batteries containing at least one air depolarized electrode.

The cell 100 has a housing that includes a cathode can 102, that serves as the positive battery terminal, an anode cup 110, that serves as the negative battery terminal, and a gasket 126 that cooperates with the can 102 and cup 110 to both electrically insulate the can 102 from the cup 110 and to provide a seal therebetween. The can 102 has a bottom surface 104, surrounded by a wall 106. The central portion of the surface 104 can be generally planar and the surrounding wall 106 can be of uniform height, substantially perpendicular to the bottom of can 102. At least one air inlet port (not shown) is located along the surface 104. Attached to the bottom surface 104 is a tab 130. The tab 130 covers and seals the air inlet port(s) to limit the flow of gases into and out of the cell 100 before the cell 100 is put into use. When the user is ready to use the cell 100, the tab 130 is removed.

The anode cup 110 and the cathode can 102 can be made electrically conductive metal. When the cell 100 is an alkaline metal-air cell, such as a zinc-air cell, the can 102 is typically made from a steel or stainless steel, plated with nickel to provide an attractive appearance and resist corrosion. The cup 110 is typically made from a clad metal, such as a nickel, stainless steel, copper triclad, the stainless steel providing strength, the nickel providing an attractive external appearance, and the copper providing a relatively low hydrogen overvoltage to minimize cell gassing. The gasket 126 is typically made from an electrically nonconductive, elastomeric material, capable of providing a compressive seal between the can 102 and cup 110, such as nylon.

An anode mixture 112, including an active material, typically a metal such as zinc, is present within the interior of the metal-air cell 100. The cell also contains an oxygen reduction electrode 114 positioned below and electrically insulated from the anode mixture 112 by an electrically nonconductive, ionically conductive separator 116, and an electrolyte.

When the cell is an alkaline zinc-air cell, the active material in the anode mixture 112 is a zinc metal composition. The anode mixture 112 also includes the majority of the alkaline electrolyte in the cell and a gelling agent. The electrolyte contains water and a solute such as potassium hydroxide and/or sodium hydroxide, and the gelling agent can be an acrylic acid polymer, for example. A gas inhibitor such as, for example, indium hydroxide ($In(OH)_3$) and other additives can be included to minimize gas generation. Examples of these additives include zinc oxide and surfactants such as polyethylene glycol based compounds. Compositions of suitable anode mixture compositions in metal-air cells containing zero added mercury are disclosed in U.S. Pat. No. 6,602,629, which is hereby incorporated by reference. The amount of anode mixture 112 that is placed in the metal-air cell 100 can be less than the available volume and so an air pocket 113 is present.

The oxygen reduction electrode 114, also referred to as the air electrode, may be any material suitable for use as an air electrode. In an alkaline zinc-air cell it can include a catalytic layer 115 (FIG. 2), containing carbon, manganese oxide ($MnO_x$) and a binder such as polytetrafluoroethylene (PTFE), for example. A metal screen 118, which can be a nickel screen coated with catalyst, can be embedded within the air electrode 114 to improve electrical conductivity of the air electrode 114 and provide good electrical contact between the air electrode 114 and the cathode can 102. A hydrophobic membrane 120 made of a polytetrafluoroethylene (PTFE) polymer, for example, can be laminated on the bottom side of the air electrode 114 facing the bottom of cathode can 102 to maintain a gas-permeable waterproof boundary between the air and electrolyte within the cell 100. In addition, the cell can also include an air diffusion membrane 122 to regulate gas diffusion rates and an air distribution membrane 124 to distribute air evenly to the air electrode 114.

In FIG. 1, tab 130 covers one or more air inlet ports in the can bottom 104. The tab 130 includes a base layer 132 and an adhesive layer 138. The base layer 130 can be a polymeric material, and the adhesive layer 138 is preferably an adhesive material that has better adhesion to the base layer 132 than to the can bottom 104, so that when the tab 130 is removed from the cell 100, all of the adhesive remains on the tab 130, with no residue left on the can bottom 104 or within the air inlet port(s). The base layer 132 has a permeability between its outer surface (the major surface farthest from the can bottom 104) and its inner surface (the major surface closest to the can bottom 104). The permeability can be determined by measuring the transmission rate of a gas through a portion of the base layer 132.

Figure 2:
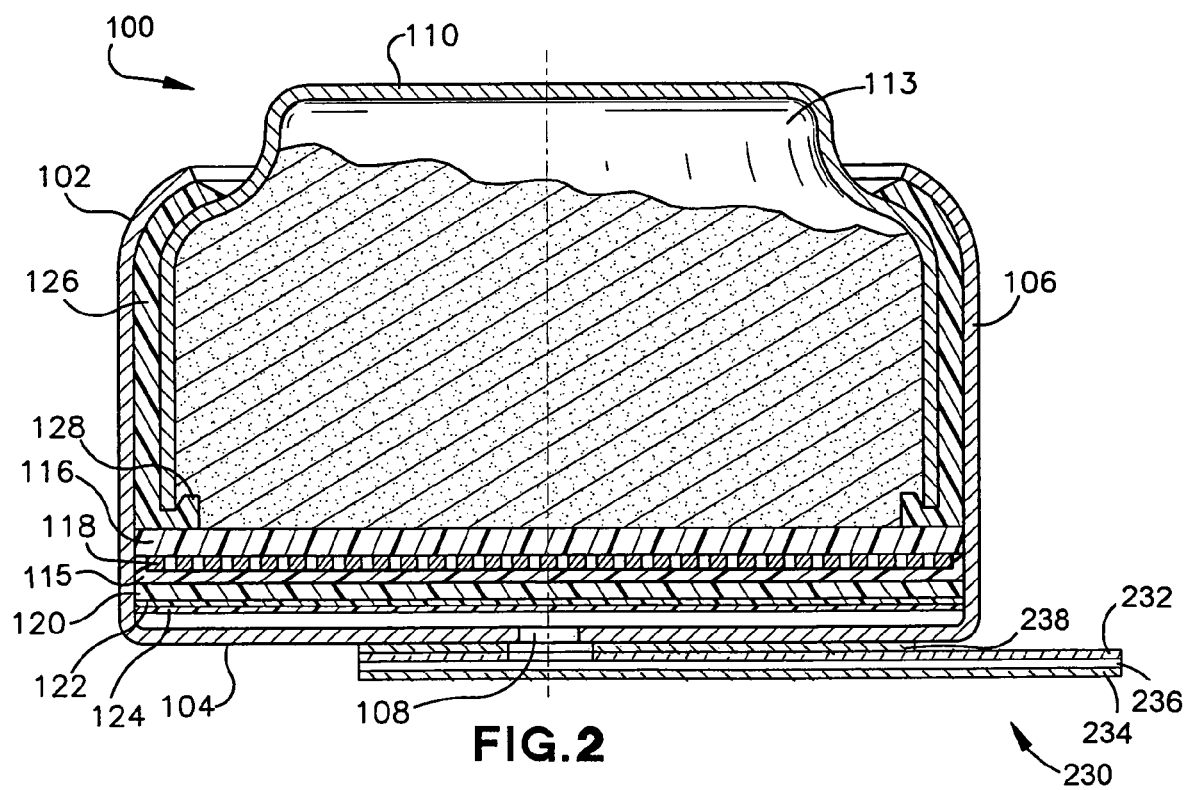
FIG. 2 is a cross-sectional view of a metal-air cell with a sealing member attached thereto.

FIG. 2 is a cross-sectional view of the same metal-air cell 100 as in FIG. 1, but with a different tab 230 covering the air inlet port 108. Cell 100 can have a single air inlet port 108, as shown, or a plurality of air inlet ports. Tab 230 includes a base layer 232, an outer layer 234, a laminating adhesive layer 236 disposed between the base and outer layers 232, 234, and an adhesive layer 238 for holding the base layer 232 to the can bottom 104. The base and outer layers 232, 234 can be made of the same type of material, with the same or different thicknesses, or they can be made of different materials. Preferably the base layer 232 has greater strength than the outer layer 234 for best adhesion of the tab 230 to the can bottom. This is especially important in alkaline zinc-air cells with no added mercury, since they tend to gas more than cells containing mercury, and the gas generated can tend to push the tab 230 away from the can bottom 104 over time.

The tab shown in FIG. 1 has a single layer of polymer film, and the tab shown in FIG. 2 has two layers of film. Other embodiments of a tab according to the invention can have more than 2 polymer film layers (i.e., one or more intermediate layers disposed between the base and intermediate layers). Other types of materials can be used for one or more of the base, outer and intermediate layers (e.g., metal layers, including metal foils and metal depositions applied to polymer films); for convenience, unless otherwise indicated, the term "film" is used below to refer to not only polymeric films, but layers of such alternative materials as well. While the tabs are described above as having layers of film laminated together with adhesive, alternative means can be used to laminate the base, outer and any intermediate layers (e.g., heat bonding).

The magnitude of the permeability of a material (its measured value) is dependent upon the gas whose transmission rate is determined; however, for the major air gases of interest and the gases of interest that may be present inside the cell, the permeability values of those gases are generally directly proportional to one another. In other words, a material with a relatively high oxygen permeability, for example, will also have a relatively high hydrogen permeability, though the actual transmission rates for oxygen and hydrogen may differ substantially.

As used herein, permeability is independent of the thickness of a material. The thickness of a material can affect how quickly the onset of a gas reaching the far surface of the material, but not the rate of passage of the gas thereafter. Because the problem solved by the invention involves the transmission of gases through a tab over a relatively long period of time, the thickness of tabs and tab layers is generally of relatively little importance. The permeability of a multilayer tab is controlled by the permeability of the least permeable layer.

The passage of gases through a layer of high permeability material, parallel to the interfacial surface between the tab and the cell housing, can also contribute to the overall rate of gases entering and leaving a cell when that layer is immediately adjacent to the cell or is on the cell side of the least permeable layer, but this effect can be minimized by minimizing the thicknesses of layers of highly permeable materials.

If an adhesive layer is the least permeable layer of the tab, areas of high permeability can be produced by applying the adhesive in a pattern on the surface of one of the film layers, using any suitable technique, or a hole can be punched in the adhesive layer before it is applied to one of the film layers.

The permeability in an area of the tab can be increased by removing at least the least permeable layer from that area of the tab. Preferably the outer layer of the tab is a continuous layer to provide an attractive appearance. Preferably the base layer of the tab is the strongest layer of film to provide good adhesion of the tab to the battery. Generally, the stronger the film, the less permeable it is. Therefore, in a preferred embodiment the base layer will be removed in the high permeability area of the tab. This can be accomplished by punching a hole in the base film layer prior to laminating it to the other film layer(s). The base layer can be uncoated or coated on one or both sides with adhesive prior to punching the hole. For tabs with more than two film layers, holes can be punched in two adjacent film layers simultaneously, preferably after laminating those layers together.

An advantage to the invention is that methods of making high permeability areas in the tabs can be adapted to existing manufacturing processes and tabs, and conventional tabs can be made into tabs according to the invention in various ways. For example, for a tab with two film layers, a hole can be punched in the less permeable film layer, and then the two layers of film can be bonded together, or a hole can be punched through all layers of a two-layer tab, with an additional layer of film then bonded thereto as a new outer film layer.

Individual tabs are often cut from a large sheet or long strip of laminate tab stock in large scale manufacturing. Areas of high permeability must be positioned so they will be in the desired locations in the cut tabs. This can be done by any suitable method, such as registering one or more layers of the tab stock at appropriate points in the process of making the tabs.

The optimum balance between sealing the battery well enough with the tab to prevent degradation of discharge capacity and limiting current of the battery and maintaining at least a minimum battery open circuit voltage (OCV) during storage will depend in part on the battery size and type, the expected storage conditions and the expected use (e.g., the requirements of devices in which the battery is likely to be used). Both of these factors are dependent upon the rates of ingress and egress of gases (volumes per unit of time) into and out of the battery. These rates can be affected by changing either the permeability of an area of the tab that extends over at least part of an air inlet port or by changing the size of that area.

While any suitable materials can be used to make tabs according to the invention, preferred materials for the film layers are polymer films, and film layers can be made from the same or different materials. Preferred polymer films are crystalline or semicrystalline. Examples of suitable polymer films are polyethylene, polypropylene, coextrusions of polyethylene and polypropylene, and biaxially oriented polypropylene. Preferably at least one layer, and more preferably both the base layer and the outer layer are biaxially oriented polypropylene.

An adhesive used to bond layers of film together is preferably a permanent adhesive, such as a permanent acrylic adhesive. Adhesion between layers of film should be greater than the adhesion between the tab and the battery housing so the tab will not delaminate and leave adhesive and/or film residue on the battery following tab removal.

An adhesive used to attach the tab to the battery preferably has an initially high tack but allows removal of the tab from the battery with no visible residue on the battery housing. An example of a suitable adhesive is FASSON® R143 acrylic adhesive, available from Avery Dennison, Fasson Roll North America, Painesville, Ohio, USA.

An example of a suitable material for the base film layer is a coextrusion of polyethylene and polypropylene, coated with FASSON® R143 adhesive (the adhesive layer between the base layer and the battery), available as FASSON® PRIMAX 350®/R143/50#SCK from Avery Dennison. A preferred material for the base film layer is a biaxially oriented polypropylene film coated with FASSON® R143 adhesive, available as FASSON® BOPP TC/R143/50#SCK from Avery Dennison. The typical tensile stress of the adhesive coated PRIMAX 350® film is about 11,248 kg/cm$^2$ (160,000 pounds per square inch) in the machine direction and about 3,515 kg/cm$^2$ (50,000 pounds per square inch) in the transverse direction; the tensile stress of the adhesive coated BOPP film is about 914 kg/cm$^2$ (13,000 pounds per square inch) in the machine direction and about 1,617 kg/cm$^2$ (23,000 pounds per square inch) in the transverse direction. The oxygen permeability of PRIMAX 350® is typically about 934 cm$^3$/m$^2$/day.

An example of a preferred outer film layer is a biaxially oriented polypropylene film, coated with a layer of permanent acrylic adhesive (to bond the base and outer layers of film), available as No. 1240 self-wound polypropylene tape from International Graphic Films, Hudson, Ohio, USA. The typical tensile stress of the tape is about 1.2 kg/cm$^2$ (17 pounds per square inch), and the oxygen permeability is typically about 1216 cm$^3$/m$^2$/day.

Tabs according to the invention are preferably conformable tabs, as generally disclosed in U.S. patent application Ser. No. 10/743,585, filed Dec. 22, 2003, which is hereby incorporated by reference. Such tabs have a loss stiffness less than about 55,000 N/m at 20° C. to 25° C. and preferably a peel strength of about 457 grams/square centimeter (about 6.5 pounds per square inch) or greater. Permeabilities of tabs made according to the present invention will be modified by the inclusion of high permeability areas.

The air depolarized battery shown in FIGS. 1 and 2 and described above is an alkaline zinc-air button cell. The invention is particularly useful in combination with such a cell containing no added mercury. In the past, zinc has been amalgamated with mercury to minimize the generation of gas, especially hydrogen gas, in cells. From an environmental standpoint it is desirable to eliminate mercury, but doing so tends to result in increased gassing. One of the disadvantages of this gassing is that internal pressure in the cells can push against the tabs, causing them to bulge outward and even pull the tab away from the cell housing, leaving an open path for gases to enter and exit the cells. For cells with no added mercury, it is therefore desirable to improve the adhesion between the tab and the cell. However, this can reduce the rate of transmission of oxygen through the adhesive layer from the edge of the tab to the cell air inlet port, and it may be desirable to compensate by increasing the tab permeability in order to maintain a suitable cell OCV during storage.

To further improve adhesion of the tab to the battery housing, it is desirable that the surface of the battery to which the tab is attached be smooth, with no grooves, etc., such as those produced when the can bottoms of button cells like those in FIGS. 1 and 2 are embossed with the terminal polarity or other cell information.

Another advantage of the invention is that it can be used in combination with other features and methods to manage entry and exit of gasses to and from air depolarized batteries. This can provide greater flexibility in developing an optimum tab for a particular battery, greater range of choices in selection of materials, and ease of manufacturing.

The low high permeability area of the tab can include a void in one or more of the film and/or adhesive layers, as described above, or it can include a solid, high permeability area within one or more of the layers. For example, a hole could be punched in a film layer and then at least partially filled with material having a greater permeability than the film material.

The high permeability area of the tab is not limited in shape. Circular holes can be preferred for some tab manufacturing processes, but other shapes can also be used, whether the precise shape is directly related to adjusting the rate of flow of air or oxygen into the cell or not. For example, the hole can be in the shape of a plus sign (+) to provide an indication of the positive polarity of the battery terminal to which the tab is attached, as an alternative to embossing a "+" on the battery surface covered by the tab. The shape can be made more apparent through the use of colors in one or more of the layers of the tab.

Button batteries according to the invention are typically used to power hearing aids. A hearing aid battery must typically have an open circuit voltage of at least 1.3 volts to adequately power a hearing aid, and if the hearing aid does not operate properly upon installation of the battery, the user may believe that the battery is dead. Therefore, for air cell hearing aid batteries it is preferred that the cells reach an OCV of at least 1.3 volts within 30 seconds, more preferably within 15 seconds of removal of the tab by the user. To be able to reach an OCV of at least 1.3 volts within 30 seconds, it is desirable that the cell have an OCV of at least 1.25 volts before the tab is removed. However, if the OCV before tab removal is too high, cell capacity can be degraded to an undesirable level before use, so is desirable that the OCV before tab removal not exceed about 1.35 volts.

The invention, its use and advantages are further demonstrated in the following examples comparing conventional tabs and batteries with tabs and batteries according to the invention.

EXAMPLE 1

Comparative tabs for PR70 type alkaline zinc-air button cells were made. Each tab had two film layers, a base layer made from 0.0889 mm (0.0035 inch) thick PRIMAX 350® polyethylene-polypropylene film coated with R143 removeable acrylic adhesive (FASSON® PRIMAX 350®/R143/50#SCK, as describe above), and an outer layer made from 0.0254 mm (0.001 inch) thick biaxially oriented polypropylene tape with permanent acrylic adhesive (No. 1240 self-wound polypropylene tape, as described above). The two film layers were bonded together, with the permanent adhesive layer as the laminating adhesive and the removeable adhesive on the external surface of the base film layer. Each tab had a 2.67 mm (0.105 inch) radius circular section with an extension therefrom.

EXAMPLE 2

Tabs for PR70 type alkaline zinc-air button cells were made according to the invention, using the same materials as in Example 1. Prior to laminating the base and outer film layers, a 1.524 mm (0.060 inch) diameter hole was punched in the adhesive-coated PRIMAX 350® film, centered in the circular section of the tab, to create a low permeability area in the center of the circular section.

EXAMPLE 3

PR70 type alkaline zinc-air button cells, similar in design to the cells shown in FIGS. 1 and 2 and described above, were made using 5.74 mm (0.226 inch) diameter cathode cans, each with a single 0.254 mm (0.010 inch) diameter air inlet port centered on and a smooth (not embossed) bottom surface. The cells were made with no added mercury, as disclosed in U.S. Pat. No. 6,602,629. After the cells were assembled, each was sealed by attaching one of two types of tabs to the bottom of the cell, with the circular section of the tab centered on the can bottom, covering the air inlet port.

EXAMPLE 4

Cells with each type of tab were stored at each of two conditions—room temperature and ambient humidity, and 45° C. and 93 percent relative humidity. Cells with each type of tab were tested for OCV periodically during storage at each of the two conditions, and cells with each tab type were discharged at room temperature on a 3,000 ohm load for 16 hours per day to 0.9 volt, some after 1 month and others after 3 months at room temperature.

Figure 3:
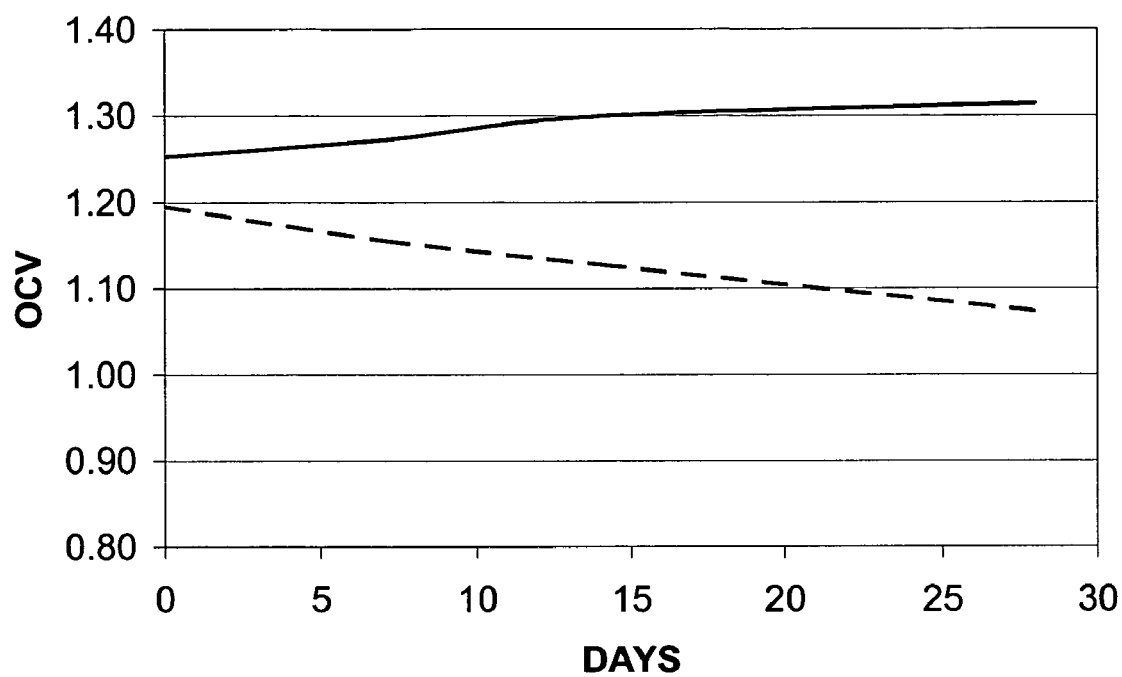
FIG. 3 is a graph of sealed cell open circuit voltage as a function of storage time at room temperature and ambient relative humidity.
Figure 4:
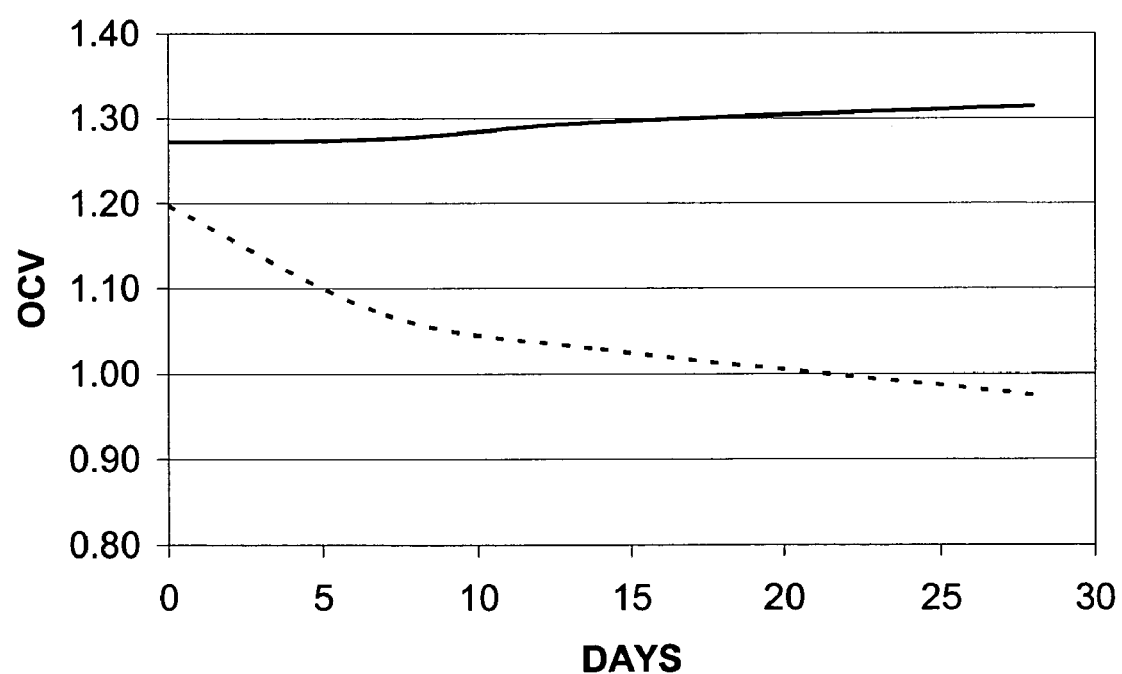
FIG. 4 is a graph of sealed cell open circuit voltage as a function of storage time at 45 degrees Celsius and 93 percent relative humidity.

OCV is plotted as a function of the number of days at room temperature/ambient humidity and 45° C./93 percent relativity in FIGS. 3 and 4, respectively. FIG. 3 shows that cells with conventional tabs (indicated by the dashed line) were below the preferred 1.25 volt minimum OCV during the first month of storage at room temperature, but cells with tabs according to the invention (indicated by the solid line) were between 1.25 and 1.35 volts. Similarly, FIG. 4 shows that cells with conventional tabs (the dashed line) were below 1.25 volts during storage for one month at 45° C. and 93 percent relativity, while cells with tabs according to the invention remained between 1.25 and 1.35 volts the entire time.

On the discharge test, there was no significant difference in cell capacity for cells with tabs according to the invention compared to cells with conventional tabs even after storage at room temperature for up to 3 months.

The above examples show that conventional tabs can be modified according to the invention to provide cells with the desired voltage characteristics both before and after tab removal without adversely affecting cell discharge capacity.

While the batteries shown in FIGS. 1 and 2 described in the above examples are button cell batteries, the invention can be incorporated into other types of air depolarized batteries. For example, the battery can be of another size and shapes, such as a larger cylindrical or prismatic battery. The battery can be a single cell or multiple cell battery. The air inlet port covered by the tab can be in the housing of an individual cell or the outer casing of a multiple cell battery. The surface of the battery sealed by the tab can be a battery terminal surface or another surface of the battery housing, and it can be metal or some other material, such as a plastic.

It will be understood by those who practice the invention and those skilled in the art that other modifications and improvements may be made to the invention without departing from the spirit of the disclose concept. The scope of protection afforded is to be determined by the claims and by the breadth of interpretation allowed by law.

The invention claimed is:

1. An air depolarized battery comprising:
a negative electrode;
a positive electrode comprising an oxygen reduction material and a hydrophobic membrane;
a separator disposed between the negative and positive electrodes;
an electrolyte;
a housing for containing the electrodes, separator and electrolyte, wherein the positive electrode is disposed in the housing with the hydrophobic membrane facing the housing;
an air inlet port disposed in the housing for allowing entry of oxygen from outside the housing into the battery; and
a sealing member disposed on an external surface of the housing, covering the air inlet port, for partially sealing the housing; wherein:
the sealing member comprises a plurality of layers, each having a permeability therethrough, and two major surfaces on opposite sides of the sealing member;
the sealing member has areas of relatively high permeability and relatively low permeability between the two major surfaces, wherein the area of highest permeability includes a portion of the lowest permeability layer with a higher permeability than a surrounding portion; and
the area of relatively high permeability between the two major surfaces is disposed such that at least a portion thereof is over at least a portion of the air inlet port.

2. The battery as defined in claim 1, wherein the sealing member comprises a base layer and an adhesive layer on one of the two major surfaces, the adhesive layer disposed between the base layer and the external surface of the housing.

3. The battery as defined in claim 2, wherein the adhesive layer is the lowest permeability layer, and the high permeability portion thereof contains no adhesive.

4. The battery as defined in claim 1, wherein the highest permeability layer has a void within the area of relatively high permeability between the two major surfaces over a portion of the air inlet port.

5. The battery as defined in claim 4, wherein the plurality of layers comprises a base layer, an adhesive layer disposed between the base layer and the external surface of the housing, and an outer layer forming an external major surface of the sealing member.

6. The battery as defined in claim 5, wherein the layer with the void is the base layer.

7. The battery as defined in claim 6, wherein the adhesive layer between the base layer and the housing also has a void in the high permeability area between the two major surfaces over a portion of the air inlet port.

8. The battery as defined in claim 5, wherein the layer with the void is the outer layer.

9. The battery as defined in claim 5, wherein the plurality of layers further comprises an intermediate layer between the base layer and the outer layer.

10. The battery as defined in claim 9, wherein the layer with the void is the intermediate layer.

11. The battery as defined in claim 5, wherein at least one of the base layer and the outer layer comprises a polymeric film.

12. The battery as defined in claim 11, wherein the plurality of layers further comprises a layer of permanent adhesive for laminating adjacent layers of polymeric film together.

13. The battery as defined in claim 11, wherein the base and outer layers comprise polymeric films of different compositions.

14. The battery as defined in claim 13, wherein the one of the base layer comprises a coextrusion of polyethylene and polypropylene and the outer layer comprises a biaxially oriented polypropylene.

15. The battery as defined in claim 11, wherein the base and outer layers comprise polymeric films of the same composition.

16. The battery as defined in claim 15, wherein the base and outer layers comprise a biaxially oriented polypropylene.

17. The battery as defined in claim 1, wherein the negative electrode comprises a zinc composition as an active material.

18. The battery as defined in claim 1, wherein the battery contains no added mercury.

19. The battery as defined in claim 1, wherein the electrolyte comprises an alkaline aqueous solution.

20. The battery as defined in claim 19, wherein the electrolyte comprises at least one solute selected from the group consisting of potassium hydroxide, sodium hydroxide and lithium hydroxide.

21. The battery as defined in claim 1, wherein the oxygen reduction material comprises at least one catalyst selected from the group consisting of manganese dioxide, manganese oxides, silver, cobalt oxide, noble metals, noble metal compounds, mixed metal compounds including rare earth metals, transition metal macrocyclics, spinels, phtalocyanines, perovskites, and activated carbon.

22. The battery as defined in claim 1, wherein the battery comprises at least one button cell.

23. An air depolarized battery comprising:
a negative electrode comprising zinc;
a positive electrode comprising an oxygen reduction material and a hydrophobic membrane;
a separator disposed between the negative and positive electrodes;
an electrolyte comprising an alkaline aqueous solution;
a housing for containing the electrodes, separator and electrolyte, wherein the positive electrode is disposed in the housing with the hydrophobic membrane facing the housing;
an air inlet port disposed in the housing for allowing entry of oxygen from outside the housing into the battery; and
a sealing member disposed on an external surface of the housing, covering the air inlet port, for partially sealing the housing; wherein:
the sealing member comprises a plurality of layers, each having a permeability therethrough, and two major surfaces on opposite sides of the sealing member;
the sealing member has areas of relatively high permeability and relatively low permeability between the two major surfaces, wherein the area of highest permeability includes a portion of the lowest permeability layer with a higher permeability than a surrounding portion; and
the area of relatively high permeability between the two major surfaces is disposed such that at least a portion thereof is over at least a portion of the air inlet port.

24. The battery defined in claim 23, wherein the battery comprises at least one button cell.

25. The battery defined in claim 24, wherein the battery is a single cell button battery.

26. The battery defined in claim 1, wherein the battery comprises a plurality of air inlet ports covered by the sealing member, and each of the air inlet ports has an area of relatively high permeability between the two major surfaces disposed such that at least a portion the relatively high permeability area is disposed thereover.

27. The battery defined in claim 1, wherein the area of relatively high permeability between the two major surfaces is over the entire air inlet port.

* * * * *